United States Patent
Khalid

(10) Patent No.: US 11,678,143 B2
(45) Date of Patent: Jun. 13, 2023

(54) LOCATION PREDICTION AND NOTIFICATION IN A WIRELESS NETWORK ENVIRONMENT

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/203,518

(22) Filed: Mar. 16, 2021

(65) Prior Publication Data

US 2022/0303723 A1  Sep. 22, 2022

(51) Int. Cl.
*H04W 4/029* (2018.01)
*H04W 48/16* (2009.01)
*H04W 76/27* (2018.01)
*H04W 4/02* (2018.01)

(52) U.S. Cl.
CPC .......... *H04W 4/029* (2018.02); *H04W 4/025* (2013.01); *H04W 48/16* (2013.01); *H04W 76/27* (2018.02)

(58) Field of Classification Search
CPC ..................................................... H04W 4/029
See application file for complete search history.

(56) References Cited

U.S. PATENT DOCUMENTS

| | | | |
|---|---|---|---|
| 2013/0072230 A1* | 3/2013 | Bansal | H04W 4/02 455/456.2 |
| 2014/0113666 A1* | 4/2014 | Arvidsson | H04W 64/00 455/458 |
| 2015/0289229 A1* | 10/2015 | Ahluwalia | H04W 68/04 455/458 |
| 2019/0357298 A1* | 11/2019 | Li | H04W 68/04 |

* cited by examiner

*Primary Examiner* — Qutbuddin Ghulamali
(74) *Attorney, Agent, or Firm* — Armis IP Law, LLC

(57) ABSTRACT

A communication management resource receives notification of an incoming communication (such as from a calling party) directed to a mobile communication device in a wireless network environment. In response to receiving the notification, the communication management resource predicts a current location of the mobile communication device based on a prior history of tracking the mobile communication device and a time of receiving the call alert. The communication management resource initiates wireless transmission of the call alert in a wireless signal from a first wireless base station at the predicted current location.

27 Claims, 13 Drawing Sheets

165-1

FOR A WEEKDAY (MONDAY - FRIDAY):     FOR UDIV = YYYY

| TIME RANGE | LOCATION AND PROBABILITY | LOCATION AND PROBABILITY | LOCATION AND PROBABILITY | |
|---|---|---|---|---|
| 12AM - 7AM | L211 (95%) | L212 (4%) | L215 (1%) | } RANKING 301 |
| 7AM - 6PM | L212 (85%) | L211 (8%) | L215 (4%) | } RANKING 302 |
| 6PM - 12AM | L211 (55%) | L213 (25%) | L214 (9%) | } RANKING 303 |

165-2

FOR A WEEKEND (SATURDAY - SUNDAY):     FOR UDIV = YYYY

| TIME RANGE | LOCATION AND PROBABILITY | LOCATION AND PROBABILITY | LOCATION AND PROBABILITY | |
|---|---|---|---|---|
| 12AM - 7AM | L211 (92%) | L215 (5%) | L212 (3%) | } RANKING 311 |
| 7AM - 6PM | L211 (55%) | L212 (27%) | L213 (8%) | } RANKING 312 |
| 6PM - 12AM | L211 (87%) | L213 (8%) | L214 (5%) | } RANKING 313 |

FIG. 3

LOCATION PREDICTION AND NOTIFICATION IN A WIRELESS NETWORK ENVIRONMENT

BACKGROUND

Conventional wireless systems rely on communications from a respective mobile communication device to track its location in a network environment. For example, when using a wireless network, a mobile communication device establishes a respective wireless communication link with a wireless base station. As the mobile communication device moves throughout the wireless network environment, the mobile communication device establishes connectivity with multiple different wireless base stations supporting connectivity in different respective regions.

BRIEF DESCRIPTION OF EMBODIMENTS

Embodiments herein provide novel ways of providing improved wireless communications to one or more mobile communication devices in a network environment.

More specifically, a wireless network environment includes a communication management resource (such as implemented via hardware, software, or a combination of hardware and software) that tracks a location of a mobile communication device over time. The communication management resource receives notification of an incoming communication directed to the mobile communication device in the wireless network environment. The communication management resource attempts routing of the notification to the mobile communication device.

In furtherance of providing notification of the incoming communication to the mobile communication device, in response to receiving the notice, the communication management resource predicts a current location of the mobile communication device based on detected prior locations of the mobile communication device and a time of receiving the notification. The communication management resource then initiates wireless transmission of the notice of incoming communication (such as call alert, text message, email, etc.) in a wireless signal from a first wireless base station at a highest predicted location of the mobile communication device. Via the wireless signal, the mobile communication device receives the notification of the call alert.

In further example embodiments, the communication management resource predicts the current location of the mobile communication device in response to detecting that the mobile communication device is not wirelessly connected to any wireless base stations in the wireless network environment.

In still further example embodiments, the communication management hardware maps the time of receiving the call alert or message notice to the corresponding location of the mobile communication device.

In accordance with further example embodiments, the mobile communication device is set to an idle mode in which the mobile communication device is not wirelessly connected (such as via camping or other connection) to any wireless base stations in the wireless network environment at the time of receiving the message notification. The mobile communication device is not tracked via the wireless network during the idle mode. In a manner as previously discussed, the communication management resource predicts a current location of the mobile communication device based on the prior location history of the mobile communication device and the time of receiving the call alert.

Further embodiments herein include, via the communication management resource, monitoring (such as via tracking) a location of the mobile communication device based on wireless connectivity of the mobile communication device with a set of multiple wireless base stations in the wireless network environment at different times, prior to current time. The communication management resource produces tracking information indicating locations of the mobile communication device at different times based on the wireless connectivity. The communication management resource updates a mapping of the location of the mobile communication device over time to reflect most recent travel habits of the user and corresponding mobile communication device.

The communication management resource predicts the location of the mobile communication device based on application of the time of receiving the call alert to the tracking information. For example, in one embodiment, the communication management resource maps a time of receiving the call alert or message notification to tracking information associated with the mobile communication device and a predicted location of the mobile communication device at such time. Based on the mapping, and identified ranking information, the communication management resource identifies one or more locations in which the mobile communication device is likely located. Via one or more wireless base stations at the one or more locations, the communication management resource communicates one or more wireless signals to the mobile communication device, the one or more wireless signals indicate the message notice such as incoming call alert.

Still further example embodiments herein include, via the communication management resource, initiating wireless transmission of the call alert to the mobile communication device while the mobile communication device is in an RRC (Radio Resource Control) idle mode.

In yet further example embodiments, the communication management hardware produces a ranking of multiple locations in which the mobile communication device potentially resides at the time of receiving the call alert/communication notification. In one embodiment, the multiple locations are ranked based on a probability of the mobile communication device being present in each of the multiple locations.

In further example embodiments, the ranking information indicates a first wireless base station and a second wireless base station. The first wireless station wirelessly communicates notification of the message notification such as incoming call alert to the mobile communication device. In response to detecting absence of a response from the mobile communication device to the first wireless base station acknowledging the incoming call alert, the communication management resource initiates wireless transmission of a second wireless signal from the second wireless base station to the mobile communication device.

Embodiments herein are useful over conventional techniques because a respective mobile communication device is notified of an incoming call alert even though the corresponding wireless network may not know where the mobile communication device is located because the mobile communication device is not connected to the wireless network.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: receive notification of an incoming communication directed to a mobile communication device in a wireless network environment; predict a current location of the mobile communication device based on a prior location history of the mobile communication device and a time of receiving the notification; and initiate wireless transmission of the notification in a wireless signal from a first wireless base station at the predicted current location.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary as well as detailed description) and corresponding figures of the present disclosure as further discussed below.

BRIEF DESCRIPTION OF THE DRAWINGS

FIG. 3 is an example diagram illustrating generated tracking information according to embodiments herein.

Figure 1:
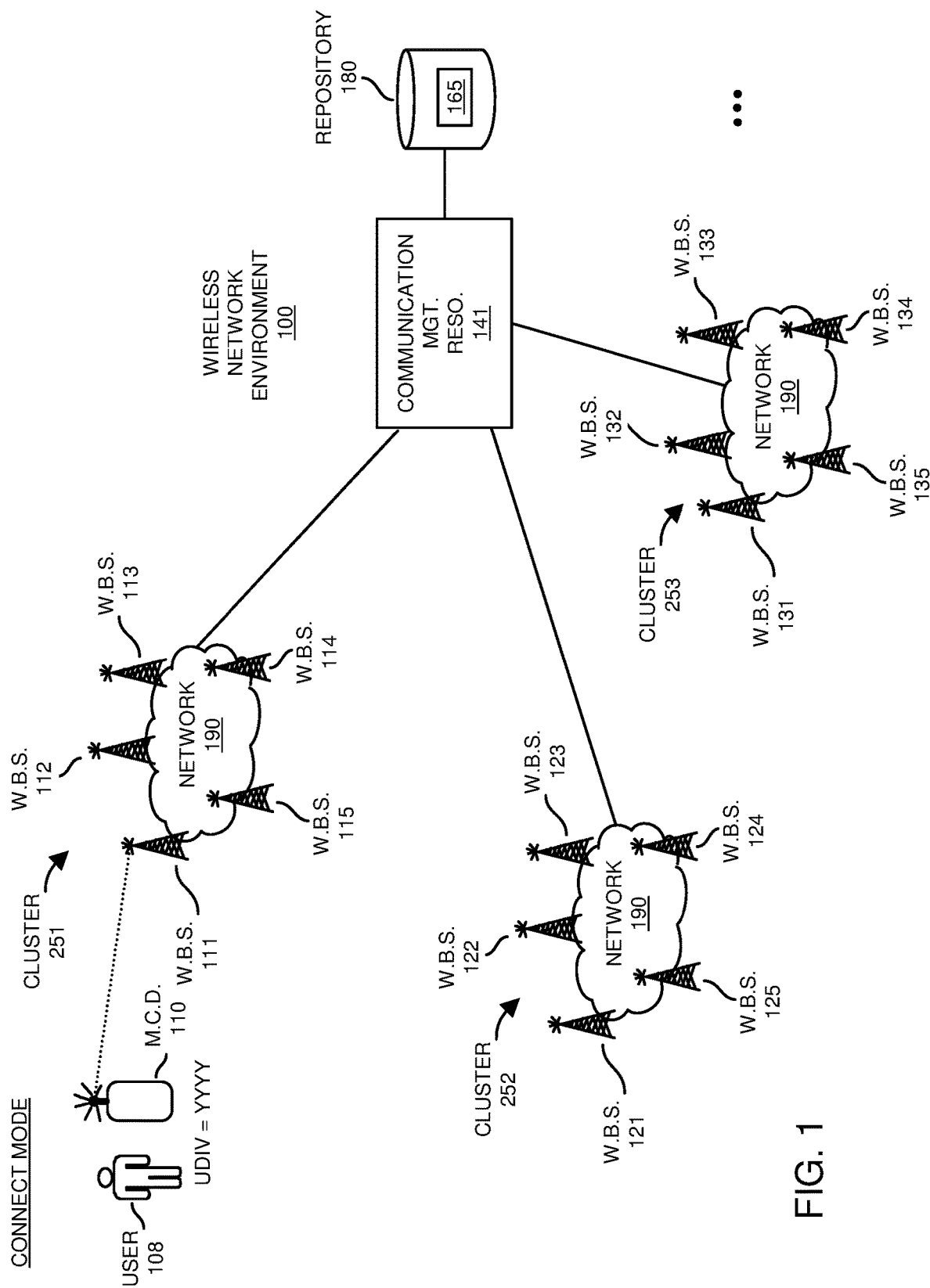
FIG. 1 is an example diagram illustrating a communication system implementing tracking and generation of tracking information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A communication management resource receives notification of a call alert (such as phone call, email message, text message, etc.) associated with an incoming communication (such as from a calling party) directed to a mobile communication device residing in a wireless network environment. In response to receiving the call alert, the communication management resource predicts a current location of the mobile communication device based on a history of previously tracking the mobile communication device and a time of receiving the call alert. The communication management resource initiates wireless transmission of the call alert in a wireless signal from a first wireless base station at the predicted current location.

In one embodiment, the communication management resource transmits the wireless signaling (a notification) from multiple wireless stations (including the first wireless station) in a cluster of wireless stations serving a contiguous geographical region in a vicinity of the predicted current location of the mobile communication device. If the mobile communication device does not respond to the wireless signal directed to it from the first wireless station or first cluster of wireless base stations, the communication management resource identifies other one or more likely locations where the mobile communication device resides and causes other wireless stations such as in one or more other wireless station in those likely locations to transmit notification of the incoming call alert to the mobile communication device.

Now, more specifically, with reference to the drawings, FIG. 1 is an example diagram illustrating a communication system implementing tracking and notifications according to embodiments herein.

As shown, wireless network environment 100 includes communication management resource 141, and multiple clusters of wireless base stations in network 190 such as cluster 251, cluster 252, cluster 253, etc.

In this example embodiment, the cluster 251 and network 190 includes wireless base station 111, wireless base station 112, wireless base station 113, wireless base station 114, and wireless base station 115.

In a similar manner, the cluster 252 includes wireless base station 121, wireless base station 122, wireless base station 123, wireless base station 124, and wireless base station 125.

Cluster 253 includes wireless base station 131, wireless base station 132, wireless base station 133, wireless base station 134, and wireless base station 135.

Note that each of the resources as discussed herein can be configured to operate as hardware, executed software, or a combination of hardware and software.

More specifically, the communication management resource 141 as discussed herein can be configured to operate communication management hardware, communication management software, or a combination of communication management hardware and communication management software; the mobile communication device 110 can be configured to operate mobile communication hardware, mobile communication software, or a combination of mobile communication hardware and mobile communication software; each of the wireless base stations as discussed herein can be configured to operate as wireless base station hardware, wireless base station software, or a combination of wireless base station hardware and wireless base station software; and so on.

As previously discussed, wireless network environment 100 includes any number of clusters.

As further shown, the user 108 operates the mobile communication device 110 at any of the different locations in wireless network environment 100. For example, while operating in a so-called connect mode (such as RRC Radio Resource Control connect mode), the user 108 and corresponding mobile communication device 110 is able to connect to network 190 via any of the wireless base stations 111, 112, 113, 114, 115, 121, 122, 123, 124, 125, 131, 132, 133, 134, 135, etc., depending on its location.

The mobile communication device 110 (assigned unique device identifier value=YYYY) supports wireless communications via any suitable one or more wireless communication protocols.

In one embodiment, the wireless network environment 100 supports LTE (Long Term Evolution and 5G-NR. The mobile communication device 110 is configured to operate in states such as RRC-Connected mode and RRC-Idle mode.

As further discussed herein, while in the RRC-Idle state, the mobile communication device 110 (user equipment) doesn't have established bearers and the network and communication management resource 140 does not track the mobile communication device 110.

Conversely, while in the connect mode of FIG. 1, the mobile communication device 110 connects to the network 190 at different times of the day, different days of the week, etc. For example, at time T1, the mobile communication device 110 connects to the network 190 (such as one or more of mobile network, Internet, etc.) via wireless connectivity to the wireless base station 111 of cluster 251.

The user 108 then roams about wireless network environment 100. At time T2, the mobile communication device 110 connects to the network 190 (such as one or more of mobile network, Internet, etc.) via respective wireless connectivity to the wireless base station 121 of cluster 252.

The user 108 further roams about wireless network environment 100. At time T3, the mobile communication device 110 connects to the network 190 (such as one or more of mobile network, Internet, etc.) via respective wireless connectivity to the wireless base station 135 of cluster 253.

In one embodiment, each time the user 108 connects to the network 190 at different locations, the communication management resource 141 and components of network environment keep track of the respective wireless connectivity and corresponding times (time of day, day of week, etc.) via tracking information 165 stored in repository 180.

Figure 2:
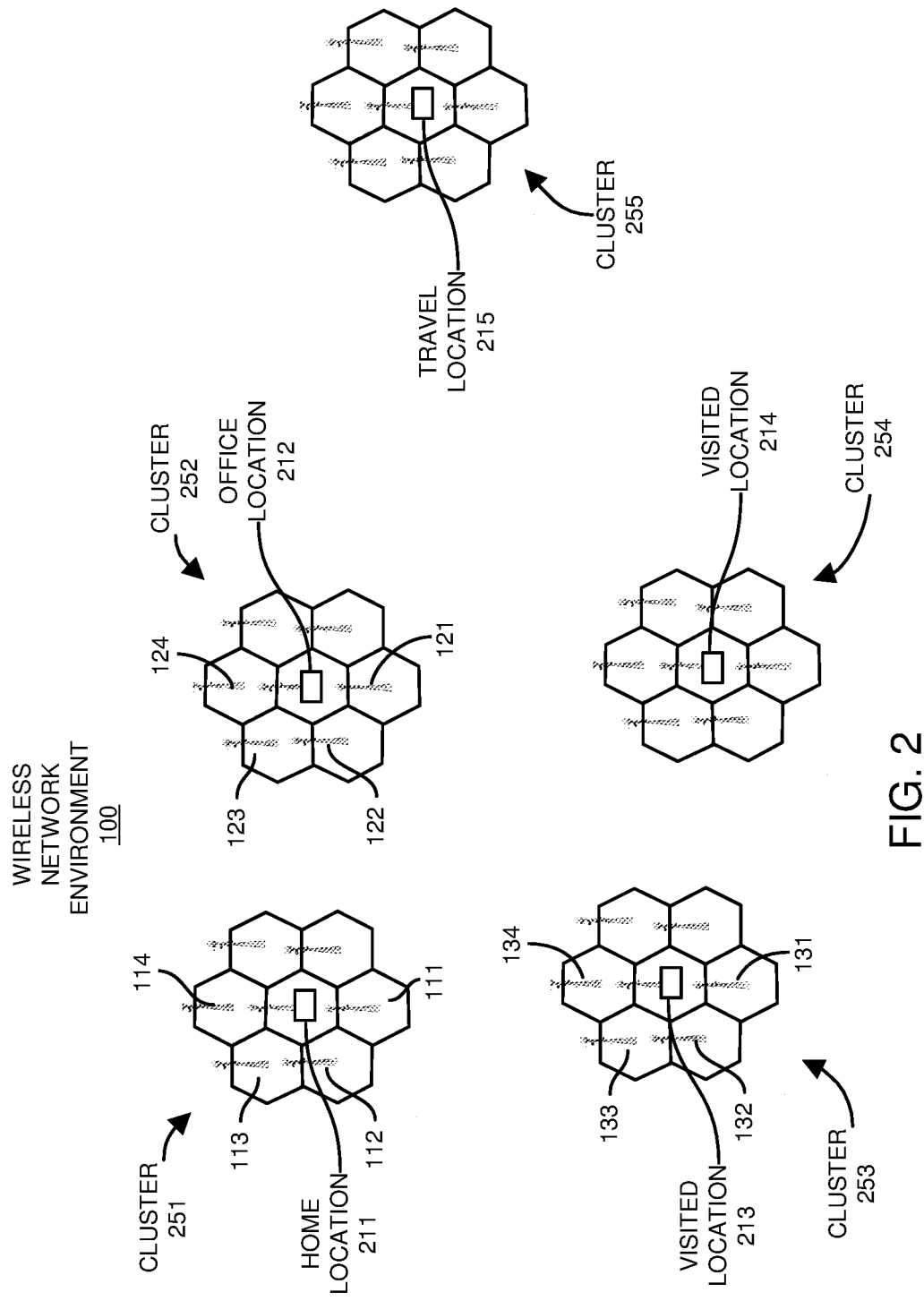
FIG. 2 is an example diagram illustrating clusters of wireless base stations (such as tracking areas) according to embodiments herein.

FIG. 2 is an example diagram illustrating clusters of wireless base stations (such as tracking areas) according to embodiments herein.

In one embodiment, each of the different tracking areas such as associated with clusters 251, 252, 253, 254, 255, etc., represent different locations frequented by the user 108 and corresponding mobile communication device 110.

Each tracking area supports a cluster of wireless base stations supporting conductivity in that respective geographical location.

For example, the cluster 251 of wireless base stations 111, 112, 113, 114, etc., provide the mobile communication device 110 wireless connectivity to the network 190 at the home location 211; the cluster 252 of wireless base stations 121, 122, 123, 124, etc., provide the mobile communication device 110 wireless connectivity to the network 190 at the office location 212; the cluster 253 of wireless base stations 131, 132, 133, 134, etc., provide the mobile communication device 110 wireless connectivity to the network 190 at the visited location 213; the cluster 254 of wireless base stations provide the mobile communication device 110 wireless connectivity to the network 190 at the visited location 214; the cluster 255 of wireless base stations provide the mobile communication device 110 wireless connectivity to the network 190 at the travel location 215 (such as where the user 108 travels for work); and so on.

Thus, the tracking area such as home location 211 associated with cluster 251 represents a home location of the user 108 such as where the user 108 resides or domiciles. The mobile communication device 110 (user equipment) is typically located in the home location 211 at certain times of the day such as at night and early morning.

At other times of the day during the week, such as weekdays between Monday-Friday 9-6 PM, the user 108 will be at the office location 212 or, if away for work, travel location 215.

Yet further, on weekends the user 108 is likely to be either at the home location 211 or other locations such as office location 212, visited location 213, visited location 214, etc. In one embodiment, the tracking areas (clusters) are not contiguous with each other. In other example embodiments, one or more of the tracking areas are contiguous with each other.

In addition, note that there could be some locations that the mobile communication device 110 travels to rather infrequently. For example, parent's home or work related travel.

In one embodiment, all of these tracking areas are registration areas and, when the network is trying to locate the mobile communication device 110, the communication management resource 141 will predict a respective location of the mobile communication device 110 based on the time and prior pattern of use.

As further discussed herein, the mobile communication device 110 can be monitored as it moves about many cells in the active mode (connect mode).

In this example embodiment, the wireless network environment 100 is divided into Tracking areas in a manner as previously discussed. A cluster of cell base stations are grouped together as a tracking area.

Tracking areas (such as clusters of wireless base stations that repeatedly provide the mobile device 110 wireless connectivity over time) are assigned to each supported instance of UE as Registration Areas (RA), which is used as a base for the network to look for a UE and for the UE to report its location. RA consists of one or more TAs.

When the UE needs to connect to the network 190, it compares the Tracking Area (TA) being broadcasted by the network to the last TA stored in the device. If they are different, the respective UE updates the new TA.

In accordance with further example embodiments, each of the UEs are assigned a list of TAs and if the UE moves within these TAs, it doesn't have to perform registration. This helps reduce signaling needed to update registration. In addition, in one embodiment, periodic updates are needed based on timer etc.

The network may need to reach out (such as in response to receiving an incoming call alert notification, received communication notice, etc., directed to the mobile communication device) to the mobile communication device 110 while it is in an idle state. In one embodiment, in the idle state, the mobile communication device 110 does not communicate (transmit) any wireless beacons in the wireless network environment 100. In such an instance, the communication management resource 141 and corresponding network equipment are not aware of a location of the mobile communication device 110. In order to find a mobile communication device, the communication management resource 141 sends out wireless paging messages to locate a UE as discussed herein.

Note further that the size of the TAs could vary depending on the type of cells. For example, fewer cells could be a part of a given TA due to their larger sizes. In general, the size of a TA may be a compromise between the number of cells and the number of updates. For example, a large TA means fewer registration updates (due to movement of the UE) but a large number of cells will have to perform paging.

In further example embodiments, the TA is assigned an RA consisting of TA lists where the UE resides most often. An example of tracking the mobile communication device 110 and generation of location prediction information of the mobile communication device 110 is shown in FIG. 3.

FIG. 3 is an example diagram illustrating generation of tracking information according to embodiments herein.

As previously discussed, the communication management resource 141 or other suitable entity keeps track of the mobile communication device 110 connecting to the network 190 at different locations when in the so-called RRC connected mode.

Based on the learned habits of the mobile communication device 110 using the network 190 at different locations in the connected mode, the communication management resource 141 produces tracking information 165. The tracking information 165 includes ranking information indicating highest likelihood locations where the mobile communication device 110 is likely to be at different times of day for a given type of day network (such as weekday, weekend, etc.).

In this example embodiment, the communication management resource 141 produces ranking information 301 of tracking information 165-1 to indicate different possible locations of the mobile communication device 110 between a time range of 12 AM and 7 AM for a respective weekday. For example, based on a history of multiple instances of the mobile communication device 110 connecting to different wireless base stations in the wireless network environment 100 at different times (while in the connected mode as previously discussed) between 12 AM and 7 AM for a respective weekday, the communication management resource 141 or other suitable entity produces the ranking information 301 to indicate that between time 12 AM and 7 AM on a weekday: i) there is a 95% chance that the user 108 and corresponding mobile communication device 110 are at location 211 (home environment); ii) there is a 4% chance that the user 108 and corresponding mobile communication device 110 are at location 212 (office environment); iii) there is a 1% chance that the user 108 and corresponding mobile communication device 110 are at location 215 (travel environment).

In this example embodiment, the communication management resource 141 produces ranking information 302 of tracking information 165-1 to indicate different possible locations of the mobile communication device 110 between a time range of 7 AM and 6 PM for a respective weekday. For example, based on a history of the mobile communication device 110 connecting to different wireless base stations in the wireless network environment 100 at different times between 7 AM and 6 PM for a respective weekday, the communication management resource 141 or other suitable entity produces the ranking information 302 to indicate that between time 7 AM and 6 PM on a weekday: i) there is an 85% chance that the user 108 and corresponding mobile communication device 110 are at location 212 (office environment); ii) there is a 8% chance that the user 108 and corresponding mobile communication device 110 are at location 211 (home environment); iii) there is a 4% chance that the user 108 and corresponding mobile communication device 110 are at location 215 (travel environment—such as a remote office location).

In this example embodiment, the communication management resource 141 produces ranking information 303 of tracking information 165-1 to indicate different possible locations of the mobile communication device 110 between a time range of 6 PM and 12 PM for a respective weekday. For example, based on a history of the mobile communication device 110 connecting to different wireless base stations in the wireless network environment 100 at different times between 6 PM and 12 PM for a respective weekday, the communication management resource 141 or other suitable entity produces the ranking information 302 to indicate that between time 6 PM and 12 PM on a weekday: i) there is a 55% chance that the user 108 and corresponding mobile communication device 110 are at location 211 (home environment); ii) there is a 25% chance that the user 108 and corresponding mobile communication device 110 are at location 213 (visited location such as a store, friend, etc.), iii) there is a 9% chance that the user 108 and corresponding mobile communication device 110 are at location 214 (visited location such as a friend's house, store, etc.).

In this example embodiment, the communication management resource 141 produces ranking information 311 of tracking information 165-2 to indicate different possible locations of the mobile communication device 110 between a time range of 12 AM and 7 AM for a respective weekend. For example, based on a history of multiple instances of the mobile communication device 110 connecting to different wireless base stations in the wireless network environment 100 at different times between 12 AM and 7 AM for a respective weekend, the communication management resource 141 or other suitable entity produces the ranking information 311 to indicate that between time 12 AM and 7 AM on a weekend: i) there is a 92% chance that the user 108 and corresponding mobile communication device 110 are at location 211 (home environment); ii) there is a 5% chance that the user 108 and corresponding mobile communication device 110 are at location 215 (travel environment); iii) there is a 3% chance that the user 108 and corresponding mobile communication device 110 are at location 212 (travel environment).

In this example embodiment, the communication management resource 141 produces ranking information 312 of tracking information 165-2 to indicate different possible locations of the mobile communication device 110 between a time range of 7 AM and 6 PM for a respective weekend. For example, based on a history of multiple instances of the mobile communication device 110 connecting to different wireless base stations in the wireless network environment 100 at different times between 7 AM and 6 PM for a respective weekend, the communication management resource 141 or other suitable entity produces the ranking information 311 to indicate that between time 7 AM and 6 PM on a weekend: i) there is a 55% chance that the user 108 and corresponding mobile communication device 110 are at location 211 (home environment); ii) there is a 27% chance that the user 108 and corresponding mobile communication device 110 are at location 212 (office environment); iii) there is a 8% chance that the user 108 and corresponding mobile communication device 110 are at location 213 (visited environment).

In this example embodiment, the communication management resource 141 produces ranking information 313 of tracking information 165-2 to indicate different possible locations of the mobile communication device 110 between a time range of 6 PM and 12 AM for a respective weekend. For example, based on a history of multiple instances of the mobile communication device 110 connecting to different wireless base stations in the wireless network environment 100 at different times between 6 PM and 12 AM for a respective weekend, the communication management resource 141 or other suitable entity produces the ranking information 313 to indicate that between time 6 PM and 12 AM on a weekend: i) there is a 87% chance that the user 108 and corresponding mobile communication device 110 are at location 211 (home environment); ii) there is a 8% chance that the user 108 and corresponding mobile communication device 110 are at location 213 (travel environment); iii) there is a 5% chance that the user 108 and corresponding mobile communication device 110 are at location 214 (visited environment).

In one embodiment, there is no front end work at the network 190 side for sampling and collection of the tracking data. For example, in one nonlimiting example embodiment, the tracking is performed at the back end of the wireless network environment 100 using the communication management resource 141 or other suitable entity. In further example embodiments, the communication system as discussed herein includes a database that receives feedback from MME (Mobile Management Entity) in each cluster controlling wireless connectivity of the mobile communication device 110 to different clusters.

As previously discussed, the tracking information 165 indicates the likelihood of user's cluster location based on sample data obtained from an MME (Mobile Management Entity) in the wireless network environment 100. In one embodiment, the MME purges data over time such that the tracking information 165 is always up time of day date in case wireless network usage patterns change over time.

Figure 4:
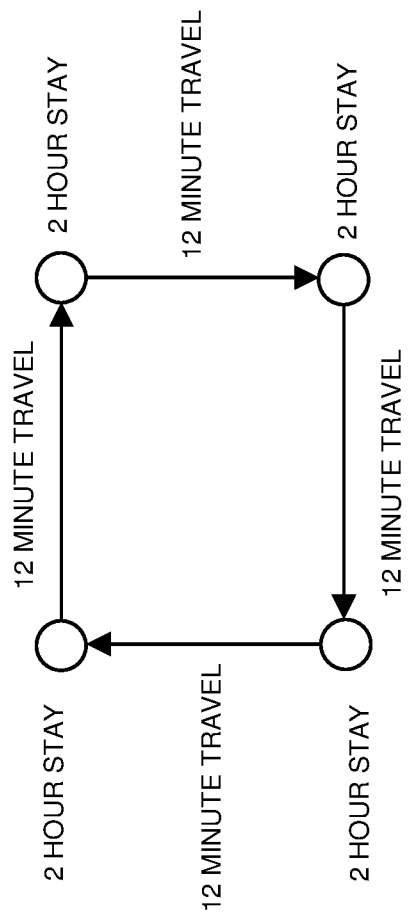
FIG. 4 is an example diagram illustrating movement of a mobile communication device in a network environment according to embodiments herein.

FIG. 4 is an example diagram illustrating movement of a mobile communication device in a network environment according to embodiments herein.

In this example embodiment, when defining tracking area zones, it is assumed that users of respective mobile communication devices are spread uniformly over the coverage area. However, in a real network scenario, users are normally distributed with a point of highest user density.

Assume in this example embodiment that the user 108 and corresponding mobile communication device 110 travel at 25 miles/hr.

For example, the user leaves home stopping by at 4 different locations (home, work, supermarket, school) and coming back to its original point of departure. The user 108 and corresponding mobile communication device 110 reside at a respective location for 2 hours.

Every two hours, the user leaves the current location for a new destination at a rate of 25 miles/hr., and assuming, 5 miles distance between points.

In an 8 hour window, the user 108 passes through four different locations, each being 5 miles apart. Traffic consumption is shared between 48 min. travel time, and 8 hr. stationary time. The user consumes connects to a respective cluster or wireless base station of the network environment during travels. In one embodiment, the user consumes 50% mobile traffic inside building, and that equals to 4 hr. of mobile traffic consumption in 8-hr data consumption window. The communication management resource 141 keeps track of the user using mobile communication device 110.

Figure 5:
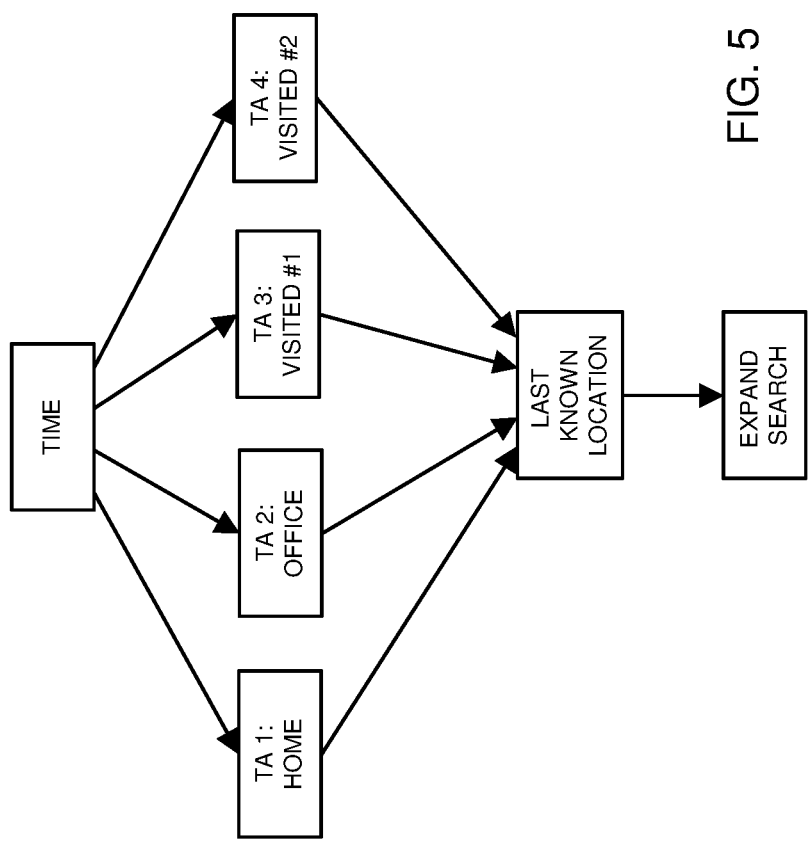
FIG. 5 is an example diagram illustrating generation of wireless notifications in different tracking areas according to embodiments herein.

FIG. 5 is an example diagram illustrating generation of wireless notifications in different tracking areas according to embodiments herein.

As previously discussed, the communication management resource 141 implements a network function named RA/TA function to track each of multiple mobile devices including communication device 110.

In one embodiment, in response to receiving an incoming call alert or incoming communication notification, the communication management resource 141 determines a time of day and day of week associated with the respective incoming communication notification. Via the tracking information 165, the communication management resource 141 determines a likely location of the mobile communication device 110 based on past history of the location of the mobile communication device and attempts to contact the mobile communication device 110 via wireless signals transmitted from one or more locations such as home environment 111 (tracking area #1), office environment (tracking area #2), etc.

If none of these notifications are successful, the communication management resource 141 transmits a communication at the last known location of the mobile communication device 110.

If communication of a respective wireless signal from a wireless base station at the last known location of the mobile communication device 110 is unsuccessful notifying the mobile communication device 110 of the incoming notice such as call or message alert, the communication management resource 141 expands a range of wireless base stations from which respective wireless signals are transmitted to notify the mobile communication device 110 of the incoming call alert.

Figure 6:
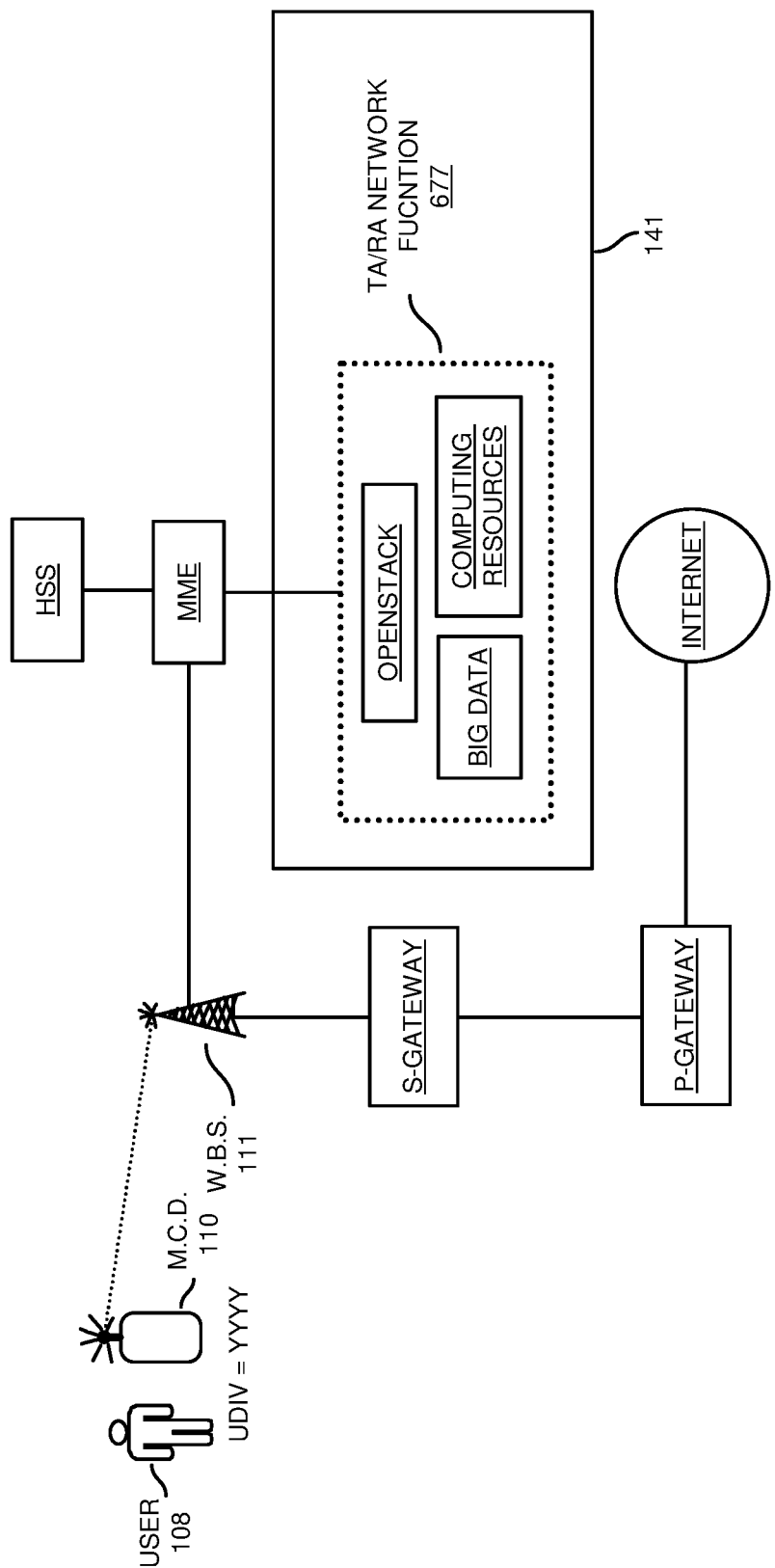
FIG. 6 is an example diagram illustrating implementation of communication equipment in a network environment according to embodiments herein.

FIG. 6 is an example diagram illustrating implementation of a network environment according to embodiments herein.

In this example embodiment, the wireless base station 111 (and each of the other wireless base stations in network environment 100) is in communication with an MME that manages wireless connectivity of the mobile communication device 110 to the network 190. As previously discussed, the MME managing connectivity is in communication with the communication management resource 141. Communication management resource 141 implements tracking function 677, which tracks the connectivity of different mobile communication devices connecting to the network at different times.

When connected to the wireless base station 111, the mobile communication device 110 has access to the Internet via communications through gateway S-Gateway and P-Gateway.

Figure 7:
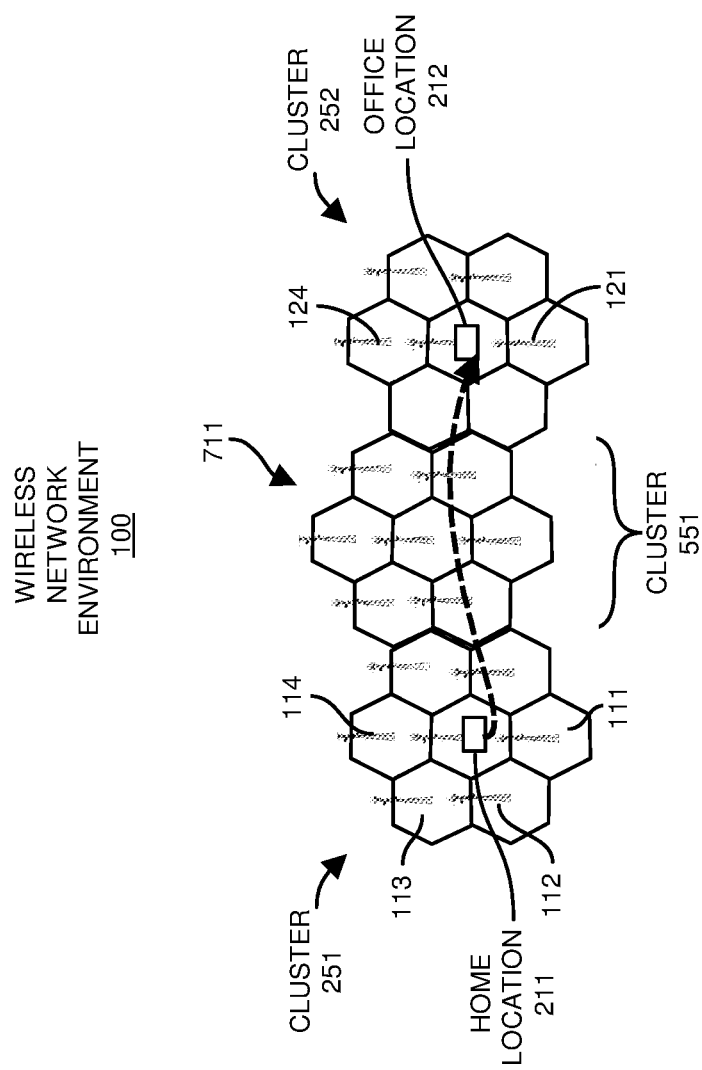
FIG. 7 is an example diagram illustrating movement of a mobile communication device between tracking areas according to embodiments herein.

FIG. 7 is an example diagram illustrating movement of a mobile communication device between tracking areas according to embodiments herein.

In this example embodiment, when in the idle mode, the mobile communication device 110 may be transitioning between the different locations 211 and 212. Thus, although, the user 108 doesn't spend a lot of time in the location 711, the user and corresponding mobile communication device 110 may be temporarily passing through location 711 supported by wireless base stations in cluster 551.

One embodiment herein includes detecting multiple regions where the user 108 and mobile communication device 110 likely reside such as at location 211 and 212. If attempts to communicate with the mobile communication device 110 at locations 211 and 212 are unsuccessful from wireless base stations at location 211 and location 212, the communication management resource 141 and corresponding MME can be configured to attempt communications from one or more wireless base stations in cluster 551 disposed between the likely locations 211 and 212. In other words, there nay be a good chance that the user and corresponding communication device 110 reside somewhere between the region of location 211 and region of location 212.

In addition, note that if the mobile communication device 110 is moving in a certain direction right before going from the connected mode to the idle mode, this trajectory can be used by the communication management resource 141 or other suitable entity as a basis in which to attempt communications with the mobile communication device from other wireless base stations.

As a more specific example, assume that the mobile communication device 110 (UE) is mobile and, given its last known velocity (speed and direction) and/or location and direction which are known to the communication management resource 141 or other suitable entity, the communication management resource 141 determines that the mobile communication device 110 and corresponding user are not located in the office environment but instead another cell. In such an instance, most of the wireless signaling as discussed herein can be saved based on user's location pattern with time dimension added to it.

Figure 8:
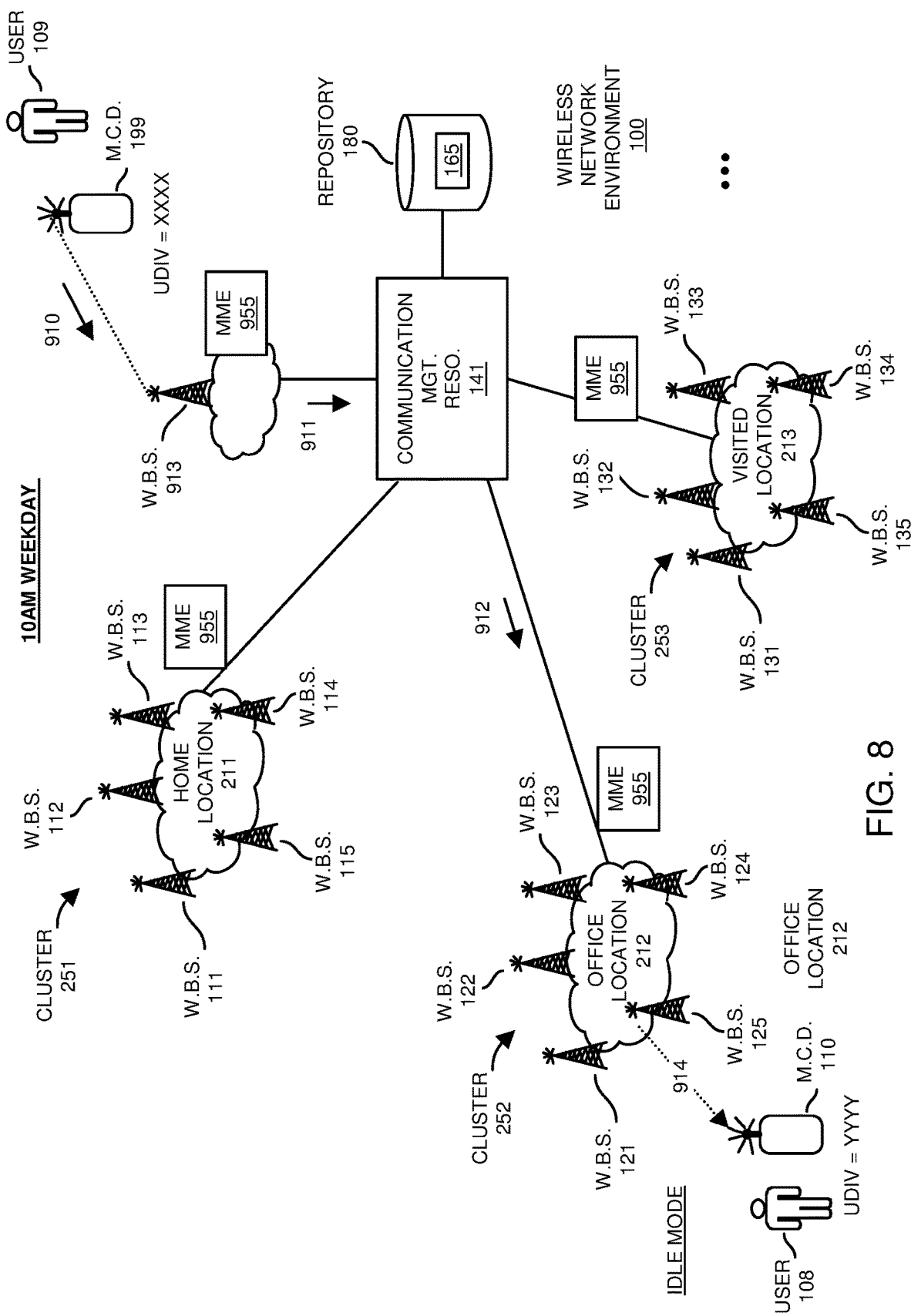
FIG. 8 is an example diagram illustrating implementation of tracking information to provide notification of an incoming call alert to a target mobile communication device according to embodiments herein.

FIG. 8 is an example diagram illustrating implementation of tracking information to provide notification of an incoming call alert or message notification to a target mobile communication device according to embodiments herein.

In this example embodiment, assume that the user 108 and corresponding mobile communication device 110 reside near location 212. The corresponding mobile communication device 110 is in the idle mode but is monitoring wireless signals for messages. In such an instance, the MME 955 (wireless base station management resource) is not aware of an actual location of the mobile communication device 110.

As further shown, the user 109 of the mobile communication device 199 generates a respective message 910 (such as phone call request) to wireless base station 913; the message is destined for delivery to the mobile communication device 110 and corresponding user 108.

In furtherance of delivering the message (such as phone call, text message, etc.), the wireless base station 913 notifies the MME 955 of communication 910. The MME 955 attempts to deliver the message to the mobile communication device 110. Because the actual location of the mobile communication device 110 is not known based on the device being in an idle mode, the MME 955 communicates (via communications 911) with the communication management resource 141 to determine a likely location of the mobile communication device 110.

For example, the MME 955 notifies the communication management resource 141 that it needs to know the location of the mobile communication device 110 assigned the unique device identifier value YYYY. The communication management resource 141 applies the unique device identifier value YYYY and current time of day LOAM (weekday) to the tracking information 165-1, resulting in selection of ranking information 302. The communication management resource 141 forwards the ranking information 302 to the MME 955. Thus, the MME 955 is aware of a ranking of different locations where the mobile communication device 110 (assigned unique device identifier value YYYY) most likely resides in the wireless network environment 100 based on past history.

The MME 955 then attempts to notify the mobile communication device 110 of the incoming call alert (such as message notification 910) associated with the mobile communication device 199. In response to receiving the ranking information 302, the MME 955 initiates communication of one or more wireless communications from the one or more wireless base stations in the cluster 252 (because it is highest ranked) and because such wireless base stations support the office location 212 where the communication management resource 140 predicts the mobile communication device 110 to be located.

In response to communication of the wireless communication 914 from the wireless base station 125 to the mobile communication device 110, the mobile communication device 110 responds (such as via a call accept) to the notification of the incoming call alert or message notification from the mobile communication device 199. The user of the mobile communication device 110 accepts the incoming call alert (such as associated with a pending phone call from the mobile communication device 199), resulting in the MME 955 providing point to point wireless connectivity (such as a phone call or other connectivity) through the network 190 between the mobile communication device 199 and the mobile communication device 110.

Figure 9:
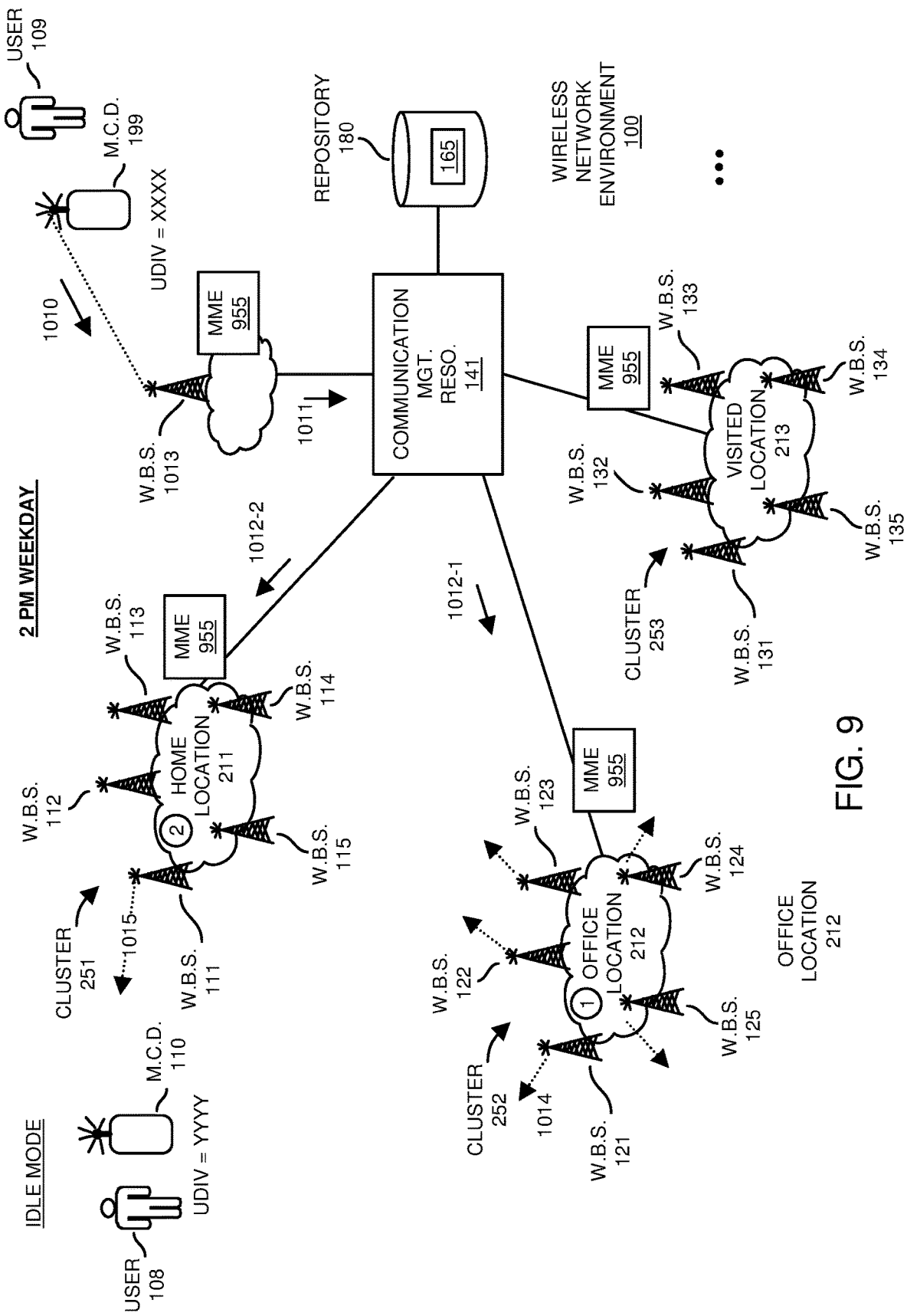
FIG. 9 is an example diagram illustrating implementation of tracking information to provide notification of an incoming call alert to a target mobile communication device according to embodiments herein.

FIG. 9 is an example diagram illustrating implementation of tracking information to provide notification of an incoming call alert or message notification to a target mobile communication device according to embodiments herein.

In this example embodiment, assume that the user 108 and corresponding mobile communication device 110 reside near location 211. The corresponding mobile communication device 110 is in the idle mode. In such an instance, the MME 955 (wireless base station management resource) is not aware of an actual location of the mobile communication device 110.

As further shown, the user 109 of the mobile communication device 199 generates a respective message 1010 to wireless base station 1013; the message (such as a phone call request) is destined for delivery to the mobile communication device 110 (destination=unique device identifier value=YYYY) and corresponding user 108.

In furtherance of delivering the message (such as phone call request, text message, etc.), the wireless base station 1013 notifies the MME 955 of communication 1010. The MME 955 attempts to deliver the message to the mobile communication device 110. However, because the actual location of the mobile communication device 110 is not known, the MME 955 communicates (via communications 1010) with the communication management resource 141 to determine a likely location of the mobile communication device 110.

For example, the MME 955 notifies the communication management resource 141 that it needs to know the location of the mobile communication device 110 assigned the unique device identifier value YYYY. The communication management resource 141 applies the unique device identifier value YYYY and current time of day 2 PM (weekday) to the tracking information 165-1 associated with the mobile communication device 110 (unique device identifier value=YYYY), resulting in ranking information 302. The communication management resource 141 forwards the ranking information 302 to the MME 955. Thus, the MME 955 is aware of a ranking of different predicted locations where the mobile communication device 110 (assigned unique device identifier value YYYY) likely resides in the wireless network environment 100.

The MME 955 then attempts to notify the mobile communication device 110 of the incoming call alert or message notice (such as based on notification 1010) associated with the mobile communication device 199. In response to receiving the ranking information 302, the MME 955 initiates communication of one or more wireless communications from the one or more wireless base stations in the cluster 252 (because it is highest ranked) and because such wireless base stations support the office location 212 where the communication management resource 140 predicts the mobile communication device 110 to be located.

The mobile communication device 110 does not respond to the one or more wireless communications transmitted from wireless base stations in the cluster 252. In such an instance, the MME 955 initiates wireless communications from one or more of the wireless base stations in cluster 251 associated with the location 211 because it is the second most likely location where the mobile communication device 110 resides as indicated by the ranking information 302.

In response to communication of the wireless communication 1015 from the wireless base station 111 to the mobile communication device 110, the mobile communication device 110 responds to the notification of the incoming call alert or message notification from the mobile communication device 199 via acceptance of the call or decision to retrieve the one or more messages associated with the notice. The user of the mobile communication device 110 accepts the incoming call and switches to the connected mode, resulting in the MME 955 providing point to point wireless connectivity (such as a phone call) through the network 190 between the mobile communication device 199 and the mobile communication device 110.

Figure 10:
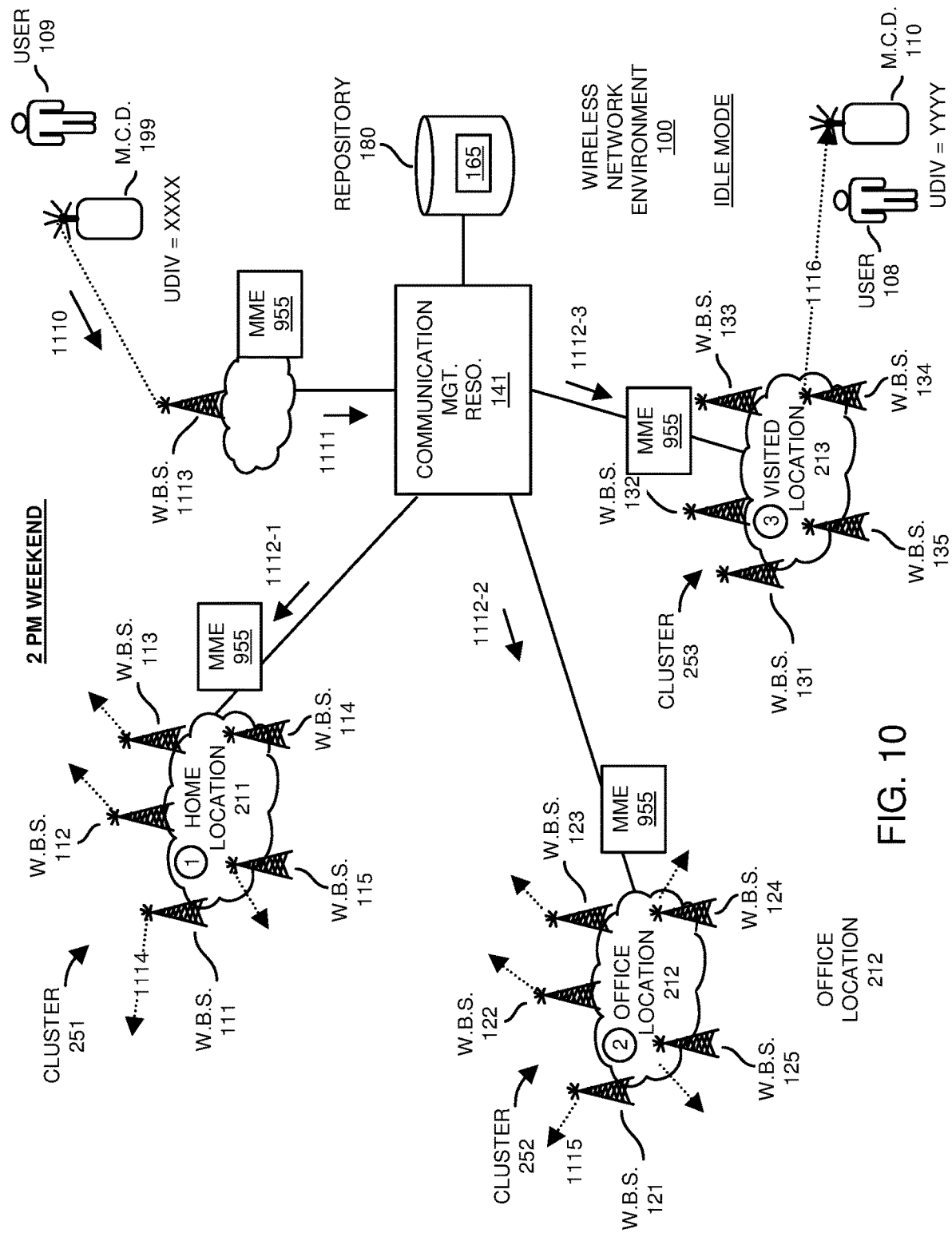
FIG. 10 is an example diagram illustrating implementation of tracking information to provide notification of an incoming call alert to a target mobile communication device according to embodiments herein.

FIG. 10 is an example diagram illustrating implementation of tracking information to provide notification of an incoming call alert to a target mobile communication device according to embodiments herein.

In this example embodiment, assume that the user 108 and corresponding mobile communication device 110 reside near location 213. The corresponding mobile communication device 110 is in the idle mode. In such an instance, the MME 955 (wireless base station management resource) is not aware of an actual location of the mobile communication device 110.

As further shown, the user 109 of the mobile communication device 199 generates a respective message 1110 to wireless base station 1113; the message is destined for delivery to the mobile communication device 110 and corresponding user 108.

In furtherance of delivering the message (such as phone call request, text message, etc.), via communications, the wireless base station 1113 notifies the MME 955 of communication 1110. The MME 955 attempts to deliver the message to the mobile communication device 110. Because the actual location of the mobile communication device 110 is not known, the MME 955 communicates (via communications 1111) with the communication management resource 141 to determine a likely location of the mobile communication device 110.

For example, the MME 955 notifies the communication management resource 141 that it needs to know the location of the mobile communication device 110 assigned the unique device identifier value YYYY (destination). The communication management resource 141 applies the unique device identifier value YYYY and current time of day 2 PM (weekend) to the tracking information 165-1 associated with the mobile communication device 110 (unique device identifier value=YYYY), resulting in ranking information 312. The communication management resource 141 forwards (such as via messages 1112-1, 1112-2, 1112-3) the ranking information 312 to the MME 955. Thus, the MME 955 is aware of a ranking of different locations where the mobile communication device 110 (assigned unique device identifier value YYYY) likely resides in the wireless network environment 100.

The MME 955 then attempts to notify the mobile communication device 110 of the incoming call alert (such as phone call, text message, etc., based on notification 1110) associated with the mobile communication device 199. In response to receiving the ranking information 312, the MME 955 initiates communication of one or more wireless communications from the one or more wireless base stations in the cluster 251 (because it is highest ranked) and because such wireless base stations support the home location 211 where the communication management resource 140 predicts the mobile communication device 110 to be most likely located.

The mobile communication device 110 does not respond to the one or more wireless communications transmitted from wireless base stations in the cluster 251. In such an instance, the MME 955 initiates wireless communications from one or more of the wireless base stations in cluster 252 associated with the location 212 because it is the second most likely location where the mobile communication device 110 resides as indicated by the ranking information 312.

The mobile communication device 110 does not respond to the one or more wireless communications transmitted from wireless base stations in the cluster 252. In such an instance, the MME 955 initiates wireless communications from one or more of the wireless base stations in cluster 253 associated with the location 212 because it is the third most likely location where the mobile communication device 110 resides as indicated by the ranking information 312.

In response to communication of the wireless communication 1015 from the wireless base station 111 to the mobile communication device 110, the mobile communication device 110 responds to the notification of the incoming call alert from the mobile communication device 199 via acceptance of the call. The user of the mobile communication device 110 accepts the incoming call, resulting in the MME 955 providing point to point wireless connectivity (such as a phone call) through the network 190 between the mobile communication device 199 and the mobile communication device 110.

Figure 11:
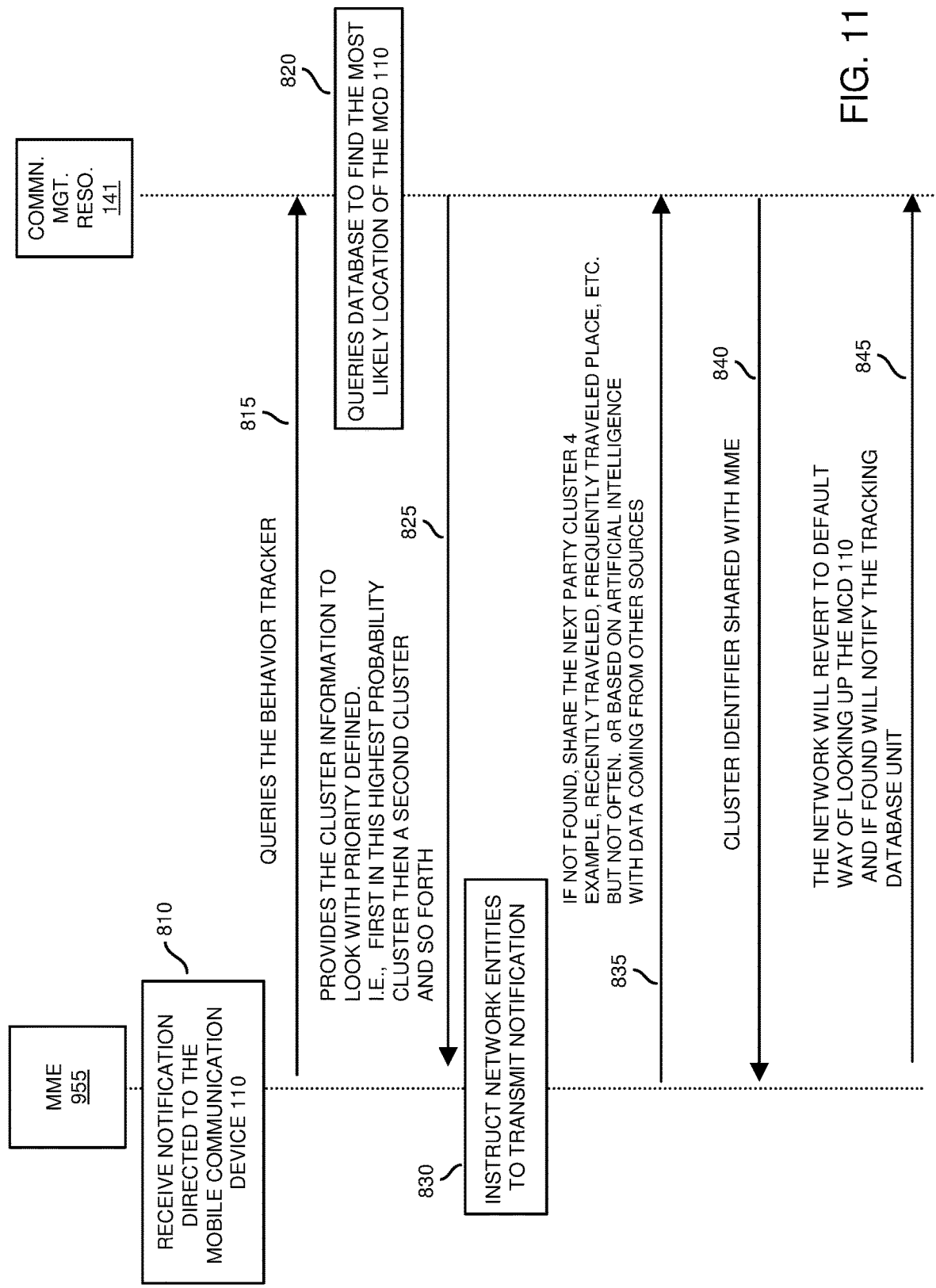
FIG. 11 is an example diagram illustrating operation flow of detecting a location of a mobile communication device according to embodiments herein.

FIG. 11 is an example diagram illustrating operation flow according to embodiments herein.

In this example embodiment, the MME 955 (Mobile Management Entity) associated with the wireless base station 913 receives notification of the incoming notification 810 (such as text message, phone call, etc.) from the mobile communication device 199 operated by the user 109. In such an instance, the MME 955 transmits communications 815 to the communication management resource 141. The communications 815 include a query to identify a respective location of the mobile communication device 110 to which the notification 810 is directed.

In processing operation 820, the communication management resource 141 uses the tracking information 165 to identify one or more most likely locations of the mobile communication device 110 to which the notification 810 is directed.

Via communications 825, the communication management resource 141 notifies the MME 955 of the most multiple predicted locations of the mobile communication device 110. In one embodiment, the communications 825 provide the appropriate cluster information in which to look for the mobile communication device 110. For example, the communications 825 notify the MME of multiple locations where the mobile communication device 110 most likely resides.

In processing operation 830, the MME 955 controls transmission of wireless signals from the multiple wireless base stations at different locations based upon the ranking information received from the communication management resource 141. For example, assume that the communication management resource 141 provides ranking information 302 to the MME 955.

In such an instance, the MME 995 first attempts to contact with the mobile communication device 110 via wireless signals transmitted from wireless base stations at location 212. If the mobile communication device 110 does not respond to the wireless signals from the wireless base stations in location 212, the MME 995 causes the wireless base stations at location 211 to transmit respective wireless signals notifying the mobile communication device 110 of the incoming call alert from the mobile communication device 199. If the mobile communication device 110 does not respond to the wireless signals from the wireless base stations in location 211, the MME 995 causes the wireless base stations at location 215 to transmit respective wireless signals notifying the mobile communication device 110 of the incoming call alert from the mobile communication device 199.

If the MME 955 does not receive a response from the mobile communication device 110 via attempts from locations 212, 211, and 215, the MME 955 transmits communications 935 to the communication management resource 141. The communications 1150 notify the communication management resource 141 of the failure.

Via communications 840, the communication management resource 141 notifies the MME 955 of a cluster identifier of multiple wireless base stations in which to attempt further communications to the mobile communication device 110 and finding it.

If the communication management resource 141 is still unsuccessful, the MME 955 reverts to a default method of providing notification to the mobile communication device 110. If found, the MME 955 notifies the communication management resource 141 of the detected location of the mobile communication device 110.

Thus, when an MME has incoming data and doesn't know of the exact location the mobile communication device 110, the communication management resource 141 queries the database (repository 180 and tracking information 165) about what cells/clusters it should send message to. The communication management resource 141 looks at a time of the query and corresponding probability tables (such as tracking information 165) built from historic information of prior connectivity.

Based on the probability and past behaviors of a respective UE, the communication management resource 141 shares a list of clusters/cells to a respective MME in which to reach out to the mobile communication device 110. In one embodiment, this will be a list of clusters with a pre-defined priority.

Figure 12:
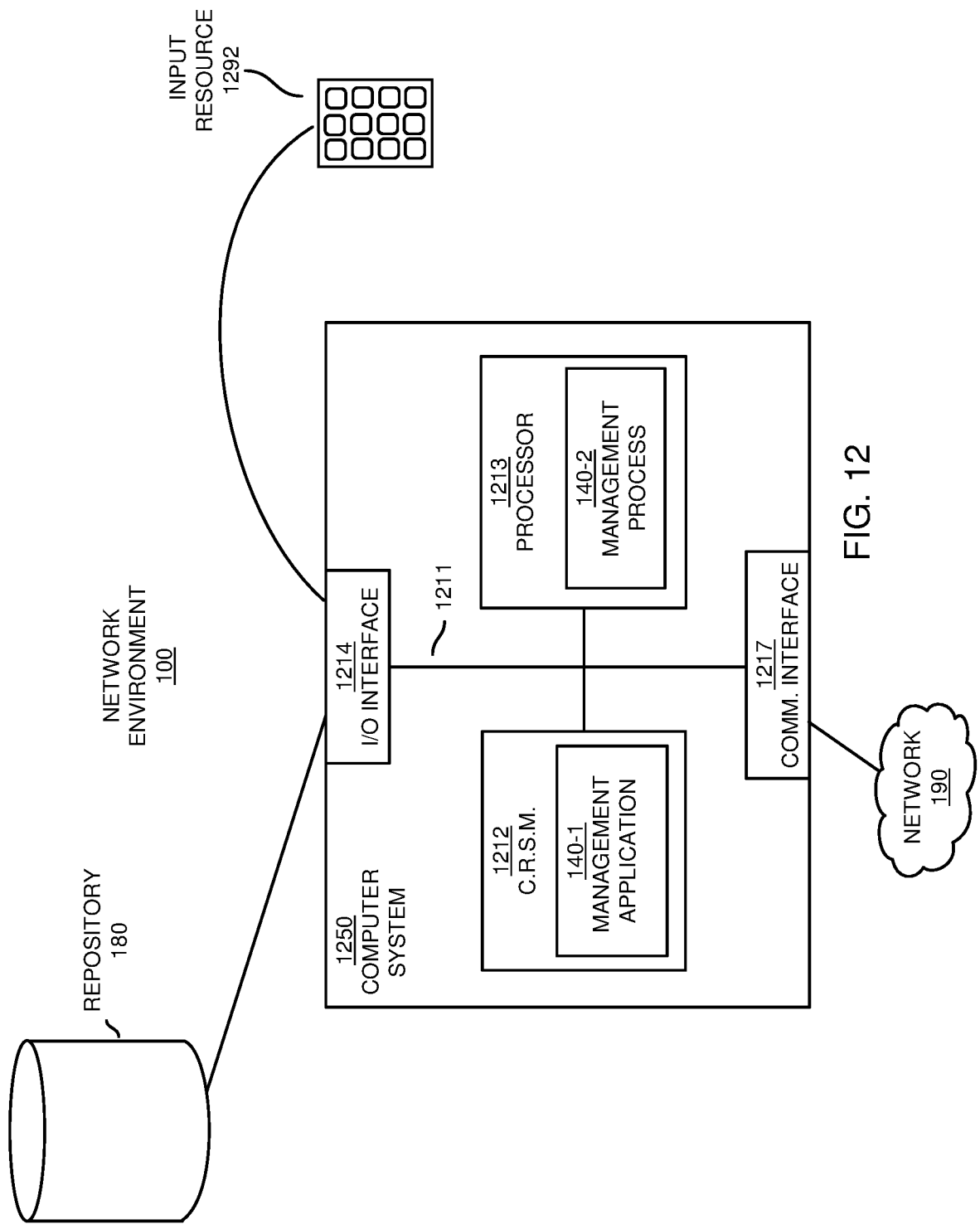
FIG. 12 is an example diagram illustrating example computer architecture operable to execute one or more operations according to embodiments herein.

FIG. 12 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 1250 of the present example includes an interconnect 1211 that coupling computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with management application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in management application 140-1 stored on computer readable storage medium 1212. Execution of the management application 140-1 produces management process 140-2 to carry out any of the operations and/or processes as discussed herein.

Those skilled in the art will understand that the computer system 1250 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 13. Note that the steps in the flowcharts below can be executed in any suitable order.

Figure 13:
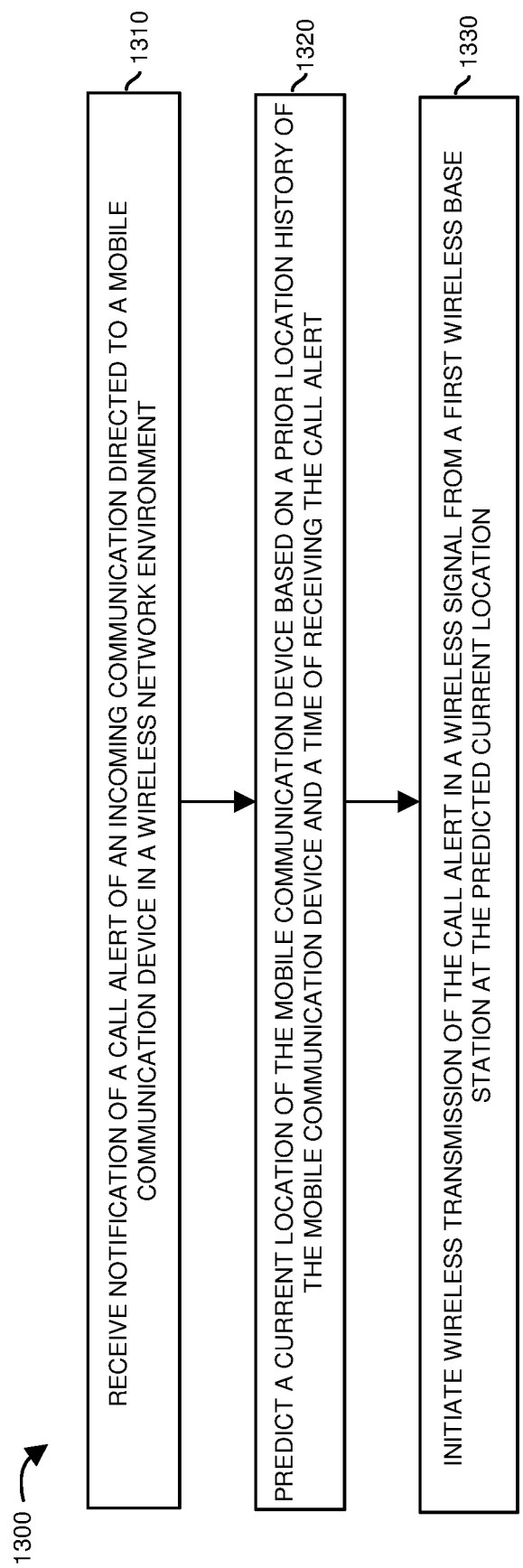
FIG. 13 is an example diagram illustrating a method according to embodiments herein.

FIG. 13 is a flowchart 1300 illustrating an example method according to embodiments. Note that there will be some overlap with respect to concepts as discussed above.

In processing operation 1310, the communication management resource 141 receives notification of an incoming communication (such as an incoming call alert 910, 1010, 1110, etc.) directed from mobile communication device 199 (or other suitable entity) to the mobile communication device 110 in a wireless network environment 100.

In processing operation 1320, the communication management resource 141 predicts a current location of the mobile communication device 110 based on a prior location history (such as indicated by tracking information 165) of the mobile communication device 110 and a time of receiving the incoming communication or call alert associated with the incoming communication.

In processing operation 1330, the communication management resource 141 initiates wireless transmission of a notification of the incoming communication (such as call alert in a wireless signal 914, 1014, 1015, 1114, 115, 1116, etc.) from one or more wireless base stations at the predicted current location of the communication device 110.

Note again that techniques herein are well suited to facilitate notification of incoming call alerts to one or more mobile communication devices in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving notification of an incoming communication directed to a mobile communication device in a wireless network environment;
   predicting a current location of the mobile communication device based on a history of tracking the mobile communication device and a time of receiving the incoming communication;
   initiating wireless transmission of the notification of the incoming communication in a wireless signal from a first wireless base station providing wireless service at the predicted current location; and
   wherein predicting the current location of the mobile communication device includes, via tracking information generated based on prior tracking of the mobile communication device, mapping the time of receiving the incoming communication to a location value, the location value indicating the predicted current location of the mobile communication device.

2. The method as in claim 1 further comprising:
   predicting the current location in response to detecting a condition in which the mobile communication device is not wirelessly connected to any wireless base stations in the wireless network environment.

3. The method as in claim 2, wherein detecting the condition in which mobile communication device is not wirelessly connected to any wireless base stations in the wireless network environment occurs in response to the mobile communication device being in an idle mode.

4. The method as in claim 3, wherein the mobile communication device is not location tracked via received communications from the mobile communication device during the idle mode.

5. The method as in claim 1 further comprising:
   initiating wireless transmission of the notification of the incoming communication to the mobile communication device while the mobile communication device is in an RRC (Radio Resource Control) idle mode.

6. The method as in claim 1, wherein the tracking information is generated based on past instances of the mobile communication device residing at different locations in the wireless network environment.

7. The method as in claim 1, wherein the tracking information is based on a ranking of past instances of the mobile communication device residing at different locations in the wireless network environment for a first time range of day in which the time of receiving the incoming communication falls.

8. The method as in claim 1 further comprising:
   predicting the current location of the mobile communication device based on application of the time of receiving the notification of the incoming communication to the history of tracking the mobile communication device.

9. A method comprising:
   receiving notification of an incoming communication directed to a mobile communication device in a wireless network environment;
   predicting a current location of the mobile communication device based on a history of tracking the mobile communication device and a time of receiving the incoming communication;
   initiating wireless transmission of the notification of the incoming communication in a wireless signal from a first wireless base station providing wireless service at the predicted current location, the method further comprising:
   prior to predicting the current location:
      monitoring locations of the mobile communication device based on wireless connectivity of the mobile communication device with a set of multiple wireless base stations in the wireless network environment at different times; and
      producing tracking information indicating the locations of the mobile communication device at different times based on the wireless connectivity.

10. The method as in claim 9 further comprising:
    predicting the current location of the mobile communication device based on application of the time of receiving the notification of the incoming communication to the tracking information.

11. A method comprising:
    receiving notification of an incoming communication directed to a mobile communication device in a wireless network environment;
    predicting a current location of the mobile communication device based on a history of tracking the mobile communication device and a time of receiving the incoming communication;
    initiating wireless transmission of the notification of the incoming communication in a wireless signal from a first wireless base station providing wireless service at the predicted current location; and
    wherein predicting the current location of the mobile communication device includes: utilizing ranking information indicating a ranking of multiple locations in which the mobile communication device potentially resides at the time of receiving the notification of the incoming communication to predict the current location of the mobile communication device, the multiple locations ranked based on a probability of the mobile communication device being present in each of the multiple locations.

12. The method as in claim 11, wherein the ranking information indicates prior use of the first wireless base station and a second wireless base station by the mobile communication device;
    wherein the wireless signal is a first wireless signal, the method further comprising:
    in response to detecting absence of a response from the mobile communication device to the first wireless base station, initiating wireless transmission of a second wireless signal from the second wireless base station to the mobile communication device.

13. The method as in claim 12, wherein the second wireless signal includes the notification of the incoming communication directed to the mobile communication device.

14. A system comprising:
    communication management hardware operative to:
       receive notification of an incoming communication directed to a mobile communication device in a wireless network environment;
       predict a current location of the mobile communication device based on a prior history of tracking the mobile communication device and a time of receiving the notification of the incoming communication;
       initiate wireless transmission of the notification of the incoming communication in a wireless signal from a first wireless base station to the mobile communication device, the first wireless base station providing wireless service at the predicted current location; and wherein the communication management hardware is further operative to: use ranking information indicating a ranking of multiple locations in which the mobile communication device potentially resides at the time of receiving the notification of the incoming communication to predict the current location of the mobile communication device, the multiple locations ranked based on a probability of the mobile communication device being present in each of the multiple locations.

15. The system as in claim 14, wherein the communication management hardware is further operative to:

predict the current location in response to detecting a condition in which the mobile communication device is not wirelessly connected to any wireless base stations in the wireless network environment.

16. The system as in claim 15, wherein the communication management hardware is further operative to:

detect the condition in which the mobile communication device is not wirelessly connected to any wireless base stations in the wireless network environment, the condition occurring in response to the mobile communication device being in an idle mode.

17. The system as in claim 16, wherein the mobile communication device is not location tracked via received communications from the mobile communication device during the idle mode.

18. The system as in claim 14, wherein the communication management hardware is further operative to:

map the time of receiving the notification of the incoming communication to a location value, the location value indicating the predicted current location of the mobile communication device.

19. The system as in claim 14, wherein the communication management hardware is further operative to:

prior to predicting the current location:
  monitor a location of the mobile communication device based on wireless connectivity of the mobile communication device with a set of multiple wireless base stations in the wireless network environment at different times; and
  produce tracking information indicating locations of the mobile communication device at different times based on the wireless connectivity.

20. The system as in claim 19, wherein the communication management hardware is further operative to:

predict the current location of the mobile communication device based on application of the time of receiving the notification to the tracking information.

21. The system as in claim 14, wherein the communication management hardware is further operative to:

initiate wireless transmission of the notification of the incoming communication to the mobile communication device while the mobile communication device is in an RRC (Radio Resource Control) idle mode.

22. The system as in claim 14, wherein the ranking information indicates the first wireless base station and a second wireless base station;

wherein the wireless signal is a first wireless signal; and wherein the communication management hardware is further operative to: in response to detecting absence of a response from the mobile communication device to the first wireless base station, initiate wireless transmission of a second wireless signal from the second wireless base station to the mobile communication device.

23. A method comprising:

receiving notification of an incoming communication directed to a mobile communication device in a wireless network environment;

predicting a current location of the mobile communication device based on a history of tracking the mobile communication device and a time of receiving the incoming communication;

initiating wireless transmission of the notification of the incoming communication in a wireless signal from a first wireless base station providing wireless service at the predicted current location; and wherein predicting the current location of the mobile communication device includes:
  determining a time range in which the notification is received; and
  selecting the predicted current location amongst multiple possible locations associated with the time range.

24. The method as in claim 23, wherein the predicted current location is selected based on probability values assigned to the multiple possible locations associated with the time range.

25. A method comprising:

receiving notification of an incoming communication directed to a mobile communication device in a wireless network environment;

predicting a current location of the mobile communication device based on a history of tracking the mobile communication device and a time of receiving the incoming communication;

initiating wireless transmission of the notification of the incoming communication in a wireless signal from a first wireless base station providing wireless service at the predicted current location; and wherein predicting the current location of the mobile communication device includes: utilizing ranking information indicating a ranking of multiple locations in which the mobile communication device potentially resides to predict the current location, the multiple locations ranked based on a respective probability of the mobile communication device being present in each of the multiple locations.

26. A method comprising:

receiving notification of an incoming communication directed to a mobile communication device in a wireless network environment;

predicting a current location of the mobile communication device based on a history of tracking the mobile communication device and a time of receiving the incoming communication;

initiating wireless transmission of the notification of the incoming communication in a wireless signal from a first wireless base station providing wireless service at the predicted current location; and wherein the wireless signal is a first wireless signal, the method further comprising: in response to detecting absence of a response from the mobile communication device at the first wireless base station, initiating wireless transmission of a second wireless signal from a second wireless base station to the mobile communication device, the second wireless signal including the notification of the then incoming communication.

27. A method comprising:
receiving notification of an incoming communication directed to a mobile communication device in a wireless network environment;
predicting a current location of the mobile communication device based on a history of tracking the mobile communication device and a time of receiving the incoming communication;
initiating wireless transmission of the notification of the incoming communication in a wireless signal from a first wireless base station providing wireless service at the predicted current location; and
wherein the wireless signal is a first wireless signal;
wherein the predicted current location is a first predicted location of the mobile communication device in the network environment, the method further comprising:
predicting a second current location of the mobile communication device based on the history of tracking the mobile communication device and the time of receiving the incoming communication; and
in response to detecting absence of a response from the mobile communication device at the first wireless base station, initiating wireless transmission of a second wireless signal from a second wireless base station providing wireless service at the second predicted current location to the mobile communication device.

* * * * *

UNITED STATES PATENT AND TRADEMARK OFFICE
CERTIFICATE OF CORRECTION

| | | |
|---|---|---|
| PATENT NO. | : 11,678,143 B2 | |
| APPLICATION NO. | : 17/203518 | |
| DATED | : June 13, 2023 | |
| INVENTOR(S) | : Saran Khalid | |

It is certified that error appears in the above-identified patent and that said Letters Patent is hereby corrected as shown below:

In the Claims

Claim 26, Line 20, remove "then"

Signed and Sealed this
Twenty-second Day of August, 2023

Katherine Kelly Vidal
*Director of the United States Patent and Trademark Office*